United States Patent Office 3,277,087
Patented Oct. 4, 1966

3,277,087
4,1,2-BENZOXATHIAZINE DIOXIDES AND INTERMEDIATES IN THEIR PREPARATION
Peter H. L. Wei, Upper Darby, and Stanley C. Bell and Scott J. Childress, Philadelphia, Pa., assignors to American Home Products Corporation, New York, N.Y., a corporation of Delaware
No Drawing. Filed Aug. 21, 1964, Ser. No. 391,325
4 Claims. (Cl. 260—243)

This invention is concerned with 4,1,2-benzoxathiazine dioxides having a heterocyclic ring fused on the "b" face thereof, with intermediates in their synthesis and with a process for making such intermediates.

The benzoxathiazine dioxides of this invention have central nervous system activity, antibacterial and antiviral activity as determined by standard test procedures in warm blooded animals. The microorganisms against which particular compounds of the invention were found effective include *Bacillus subtilis*, *Brucella bronchoseptica*, *Escherichia coli*, *Lactobacillus casei*, *Mycobacterium*, *Neisseria catarrhalis*, *Pseudomonas aeroginosa*, *Salmonella paratyphi*, *Staphylococcus aureus*, and *Streptococcus faecalis*.

The claimed 4,1,2-benzoxathiazine dioxides are represented by the formula:

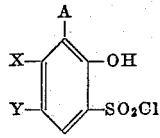

(I)

wherein X and Y are hydrogen, (lower)alkyl having up to 5 carbon atoms therein, or halogen; Q is a polymethylene chain having from 3 to 5 carbon atoms therein; Z is hydrogen or 2-alkoxy-1-pyrrolidinylsulfonyl, 2-alkoxy-piperidin-1-ylsufonyl or 2-alkoxy hexahydroazepin-1-sulfonyl.

The claimed o-halosulfonyl phenol intermediates have the general formula:

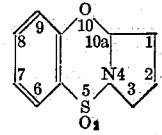

where X and Y are stated and A is hydrogen or chlorosulfonyl.

The claimed o-sulfamyl intermediates have the general formula:

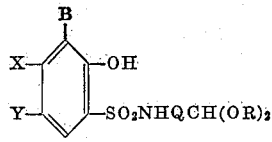

wherein X, Y ad Q are as above stated, B is hydrogen or $SO_2NHQCH(OR)_2$ and R is lower alkyl.

NOMENCLATURE OF FINAL PRODUCTS

Depending on whether the heterocyclic ring fused on the benzoxathiazine dioxide nucleus is a pyrrole, a pyridine or an azepine ring, the numbering system used in definitively naming the final products of the invention leads to different directions of peripheral numbering, as shown below. For the sake of simplicity, only representative unsubstituted compounds are shown.

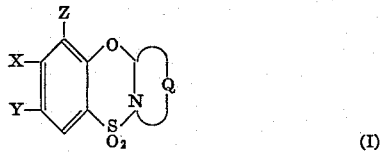

1,2,3,10a-tetrahydropyrrolo(1,2-b)(4,1,2)benzoxathiazine 5,5-dioxide.

8,9,10,10a-tetrahydro-7H-pyrido(1,2-b)(4,1,2)benzoxathiazine 5,5-dioxide.

7,8,9,19,11,11a-hexahydroazepino(1,2-b)(4,1,2)benzoxathiazine 5,5-dioxide.

PREPARATION OF CLAIMED COMPOUNDS

The claimed compounds are prepared by the reactions given below.

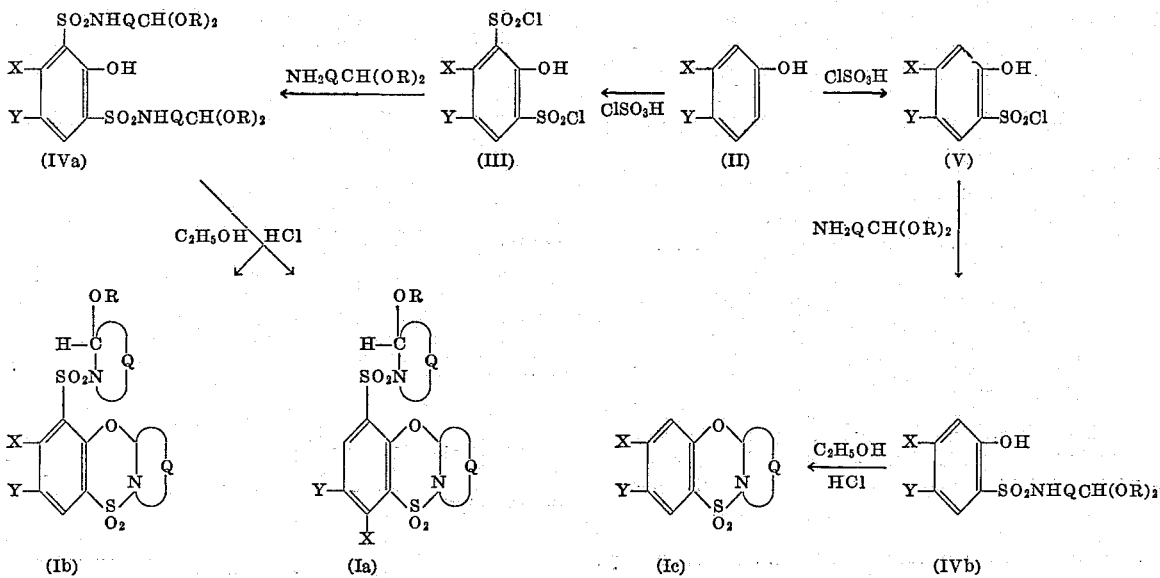

In preparing the compounds of the present invention, a known 3,4-disubstituted phenol (II) is reacted in the cold with chlorosulfonic acid. In one embodiment of the invention, the reaction mixture is heated on a steam bath following the addition of the phenol to the acid and then cooled to room temperature. Thionyl chloride next is added and the mixture is again briefly heated. The mixture while hot is poured on cracked ice to give a gummy solid. This solid is extracted with benzene. The benzene extracts are washed with water and dried. The benzene is distilled off to give an oily residue which upon treatment with hexane yields the 2,6-disulfonyl chloride congener (III) of the starting material. This compound is treated in an inert solvent with equimolar amounts of an omega-aminoalkyl acetal [$H_2N-Q-CH(OR)_2$] dissolved in the same solvent. The reaction mixture is stirred, diluted with water and extracted with benzene. The benzene solution is dried, the benzene is distilled off and the residue which consists of the crude 2-hydroxy-N,N'-bis(omega,omega'-dialkoxyalkyl) - 1,3 - benzenedisulfonamide (IVa) is dissolved in ethanol. The resulting alcoholic solution is acidified with hydrochloric acid and allowed to stand overnight. The alcohol is distilled off and the residue is dissolved in benzene, the benzene solution is first washed with water and dried. The benzene is removed and the residue is heated on a steam bath while in solution with hexane to give white solids of the two compounds shown as Ia and Ib. It will be noted from the foregoing flow sheet that because of the presence of two identical cyclizable groups on the nucleus of the compounds of Formula IVa, ring formation can take place by the reaction of either of these groups with the hydroxyl group. The unreacted group then undergoes internal ring closure to form the 2-alkoxy-1-heterocyclicsulfonyl substituent.

In another embodiment of the present invention, the substituted phenol starting material (II) is added with cooling to chlorosulfonic acid, and, after stirring, the reaction mixture is poured on ice. The acid solution which results is extracted with benzene. Then, the benzene extracts are washed with water and dried. Removal of the benzene yields the intermediate 2-hydroxybenzenesulfonyl chloride (V). Compound (V) is dissolved in an inert solvent such as dimethoxyethane containing an acid scavenger such as triethylamine and reacted with an omega-aminoalkyl acetal of the formula

where Q and R are as stated above. This reaction is effected preferably in the cold and with equimolar amounts of the reactants. The resulting reaction mixture is heated, diluted with water and extracted with benzene. The benzene solution is dried, and concentrated. The residue, an N-(omega,omega-dialkoxyalkyl)-2 - hydroxybenzenesulfonamide (IVb), is dissolved in ethanol. After filtering, the filtrate is acidified, heated and concentrated, and the residue is dissolved in benzene. The resulting benzene solution is washed with water, dried and concentrated to give the final product (Ic).

The invention is further illustrated by the following examples. It is to be kept in mind that these examples are only given to generally show the processes leading to the new compounds and are not intended to limit the invention.

*Example I.—Preparation of 5-chloro-4-methyl-2-hydroxy-1,3-benzenedisulfonyl chloride*

To a cold solution of 550 ml. of chlorosulfonic acid was gradually added 200 g. of 4-chloro-3-methylphenol. The solution was heated on a steam bath for two hours and then cooled. Thionyl chloride (200 ml.) was added and the mixture heated again for one-half hour. The mixture was slowly poured on cracked ice. The gummy solid was extracted with benzene. The benzene extracts were first washed with water and then dried over anhydrous magnesium sulfate. After removal of benzene the oily residue was treated with hexane to give a crude solid material which was recrystallized from a mixture of benzene and hexane to give the title compound melting at 80–1° C.

Calcd. for $C_7H_5Cl_3S_2O_5$: C, 24.75; H, 1.47; Cl, 31; S, 18.75. Found: C, 25.09; H, 1.48; Cl, 30.8; S, 18.3.

In similar fashion but using instead of 4-chloro-3-methylphenol, the following reactants:

4-bromo-3-methylphenol,
3-chloro-4-methylphenol,
3-bromo-4-methylphenol,
4-butyl-3-chlorophenyl, and
3-butyl-4-chlorophenol there are obtained, respectively, 5-bromo-4-methyl-2-hydroxy-1,3,benzenedisulfonyl chloride;
4-chloro-5-methyl-2-hydroxy-1,3-benzenedisulfonyl chloride;
4-bromo-5-methyl-2-hydroxy-1,3-benzenedisulfonyl chloride;
5-butyl-4-chloro-2-hydroxy-1,3-benzenedisulfonyl chloride;
4-butyl-5-chloro-2-hydroxy-1,3-benzenedisulfonyl chloride.

*Example 2.—Preparation of 7-chloro-1,2,3,10a-tetrahydro-8 and 6 - methyl - 9 - (2-ethoxy-1-pyrrolidinylsulfonyl) pyrrolo(1,2-b)(4,1,2)benzoxathiazine 5,5-dioxide*

To a cold dioxane solution of 5.0 g. (0.0376 m.) omega-aminobutyraldehyde diethylacetal containing 6.0 g. of triethylamine was slowly added 9.05 g. (0.0376 m.) of 5 - chloro-4-methyl-2-hydroxy-1,3-benzenedisulfonyl chloride in the same solvent. The mixture was stirred for a few minutes, diluted with water and extracted with benzene. The benzene solution was dried over anhydrous magnesium sulfate. After benzene was removed the methoxybutyl)-1,3-benzenedisulfonamide, was dissolved in ethanol and acidified with hydrochloric acid. The solution was let stand at room temperature overnight. Alcohol was removed and the residue dissolved in benzene. The benzene solution was first washed with water and then dried over anhydrous magnesium sulfate. After removal of benzene the residue was heated with n-hexane to give some white solids. The crude solids were further recrystallized from n-hexane to give the title compound melting at 138–9° C.

Calcd. for $C_{17}H_{23}ClN_2O_6S_2$: C, 45.30; H, 5.15; Cl, 7.88; N, 6.22; S, 14.22. Found: C, 45.56; H, 5.02; Cl, 8.14; N, 6.31; S, 14.1.

When the materials listed under Example I are reacted with the acetals named below as indicated in Example 2, the corresponding intermediates and final products hereinafter disclosed are obtained.

| Starting Compounds | Intermediates and Final Products |
|---|---|
| 5-bromo-4-methyl-2-hydroxy-1,3-benzenedisulfonyl chloride and omega-aminobutyraldehyde dimethyl acetal. | 5-bromo-2-hydroxy-4-methyl-N,N'-bis(4,4-dimethoxybutyl)-1,3-benzenedisulfonamide; 7-bromo-1,2,3,10a-tetrahydro-8- and 6-methyl-9-(2-ethoxy-1-pyrrolidinylsulfonyl)pyrrolo (1,2-b)-(4,1,2) benzoxathiazine 5,5-dioxide. |
| 5-bromo-4-methyl-2-hydroxy-1,3-benzenedisulfonyl chloride and omega-aminovaleraldehyde dimethyl acetal. | 5-bromo-2-hydroxy-4-methyl-N,N'-bis(5,5-dimethoxypentyl)-1,3-benzenedisulfonamide; 3-bromo-2- and 4-methyl-1-(2-ethoxy-1-piperidinylsulfonyl)-8,9,10,10a-tetrahydro-7H-pyrido(1,2-b)-(4,1,2)benzoxathiazine 5,5-dioxide. |
| 5-bromo-4-methyl-2-hydroxy-1,3-benzenedisulfonyl chloride and omega-aminocaproaldehyde dimethyl acetal. | 5-bromo-2-hydroxy-4-methyl-N,N'-bis(6,6-dimethoxyhexyl)-1,3-benzenedisulfonamide; 3-bromo-2- and 4-methyl-1-(2-methoxy-1-hexahydroazepinylsulfonyl)-7,8,9,10,11,11a-hexahydroazepino-(1,2-b)(4,1,2) benzoxathiazine 5,5-dioxide. |

| Starting Compounds | Intermediates and Final Products |
|---|---|
| 2-hydroxy-4-methyl-1,3-benzene-disulfonyl chloride and omega-aminobutyraldehyde dimethyl acetal. | 2-hydroxy-4-methyl-N,N'-bis(4,4-dimethoxybutyl)-1,3-benzene-disulfonamide; 8-methyl-1,2,3,10a-tetrahydro-9-(2-ethoxy-1-pyrrolidinylsulfonyl)-pyrrolo (1,2-b)(4,1,2)benzoxathiazine 5,5-dioxide. |
| 2-hydroxy-4-methyl-1,3-benzene-disulfonyl chloride and omega-aminovaleraldehyde dimethyl acetal. | 2-hydroxy-4-methyl-N,N'-bis(5,5-dimethoxypentyl)-1,3-benzene-disulfonamide; 2-methyl-1-(2-ethoxy-1-piperidinylsulfonyl)-8,9,10,10a-tetrahydro-7H-pyrido-(1,2-b)(4,1,2)benzoxathiazine 5,5-dioxide. |
| 2-hydroxy-4-methyl-1,3-benzene-disulfonyl chloride and omega-aminocaproaldehyde dimethyl acetal. | 2-hydroxy-4-methyl-N,N'-bis(6,6-dimethoxyhexyl)-1,3-benzene-disulfonamide; 2-methyl-1-(2-ethoxy-1-hexahydroazepinyl sulfonyl)-7,8,9,10,11,11a-hexahydroazepino(1,2-b)(4,1,2)benz-oxathiazine 5,5-dioxide. |
| 5-butyl-4-chloro-2-hydroxy-1,3-benzenedisulfonyl chloride and omega-aminobutyraldehyde dimethyl acetal. | 5-butyl-2-hydroxy-4-chloro-N,N'-bis(4,4-dimethoxybutyl)-1,3-benzenedisulfonamide; 7-butyl-1,2,3,10a-tetrahydro-8- and 6-chloro-9-(2-ethoxy-1-pyrrolidinyl-sulfonyl)-pyrrolo(1,2-b)(4,1,2)-benzoxathiazine 5,5-dioxide. |
| 5-butyl-4-chloro-2-hydroxy-1,3-benzenedisulfonyl chloride and omega-aminovaleraldehyde dimethyl acetal. | 5-butyl-4-chloro-2-hydroxy-N,N'-bis(5,5-dimethoxypentyl)-1,3-benzenedisulfonamide; 3-butyl-2- and 4-chloro-1-(2-ethoxy-1-piperidinylsulfonyl)-8,9,10,10a-tetrahydro-7H-pyrido (1,2-b)-(4,1,2)benzoxathiazine 5,5-dioxide. |
| 5-butyl-4-chloro-2-hydroxy-1,3-benzenedisulfonyl chloride and omega-aminocaproaldehyde dimethyl acetal. | 5-butyl-4-chloro-2-hydroxy-N,N'-bis(6,6-dimethoxyhexyl)-1,3-benzenedisulfonamide; 3-butyl-2- and 4-chloro-1-(2-ethoxy-1-hexahydroazepinylsulfonyl)-7,8,9,10,11,11a-hexahydroazepino-(1,2-b)(4,1,2)benzoxathiazine 5,5-dioxide. |

*Example 3.—Preparation of 5-chloro-2-hydroxy-p-toluene-sulfonyl chloride*

To 380 ml. of chlorosulfonic acid (cooled in a salt-ice bath) was slowly added 130 g. of 4-chloro-3-methylphenol. The mixture was stirred in an ice bath for 30 min. and then poured into cracked ice. The resulting acid solution was extracted with benzene. Next, the benzene solution was washed with water and dried over anhydrous magnesium sulfate. Following the removal of benzene, the residue was recrystallized from n-hexane.

In similar fashion but using instead of 4-chloro-3-methylphenol,
4-bromo-3-methylphenol,
3-chloro-4-methylphenol,
3-bromo-4-methylphenol,
4-butyl-3-chlorophenyl, and
3-butyl-4-chlorophenol;

there are obtained, respectively:

5-bromo-2-hydroxy-p-toluenesulfonyl chloride,
4-chloro-6-hydroxy-m-toluenesulfonyl chloride,
4-bromo-6-hydroxy-m-toluenesulfonyl chloride,
5-butyl-4-chloro-2-hydroxybenzenesulfonyl chloride, and
4-butyl-5-chloro-2-hydroxybenzenesulfonyl chloride.

*Example 4.—Preparation of 7-chloro-1,2,3,10a-tetrahydro-8 - methylpyrrolo(1,2 - b)(4,1,2)benzoxathiazine 5,5-dioxide*

To a cold dimethoxyethane solution of 3.34 g. (0.0208 m.) of omega-aminobutyraldehyde diethylacetal containing 2.5 g. of triethylamine was slowly added 5.0 g. (0.0208 m.) of 5-chloro-2-hydroxy-p-toluenesulfonyl chloride in the same solvent. The mixture was heated in a water bath, diluted with water and extracted with benzene. The benzene solution, after drying over anhydrous magnesium sulfate, was concentrated and the residue (crude 5-chloro-2-hydroxy-N-(4,4-diethoxybutyl)-p - toluenesulfonamide) was dissolved in ethanol. Some insoluble material was filtered off. The filtrate was acidified with hydrochloric acid, heated on a steam bath for 15 min. and then concentrated. The residue upon removal of benzene was dissolved in benzene. The resulting benzene solution was washed with water, dried over anhydrous magnesium sulfate and concentrated. The residue was recrystallized from cyclohexane, to give the title compound melting at 135–7° C.

Calcd. for $C_{11}H_{12}ClNO_3S$: C, 48.2; H, 4.42; Cl, 12; N, 5.11; S, 11.72. Found: C, 48.45; H, 4.57; Cl, 12.94; N, 4.87; S, 11.4.

When the materials listed under Example 3 are reacted with the acetals named below, as described in Example 4, the corresponding intermediates and final products hereinafter enumerated are obtained.

| Starting Compounds | Intermediates and Final Products |
|---|---|
| 5-butyl-4-chloro-2-hydroxybenzene-sulfonyl chloride and omega-aminobutyraldehyde dimethyl acetal. | 5-butyl-2-hyrdoxy-4-chloro-N-(4,4-dimethoxybutyl)benzene-sulfonamide; 7-butyl-1,2,3,10a-tetrahydro-8-chloro-pyrrolo (1,2-b)(4,1,2)benzoxathiazine 5,5-dioxide. |
| 5-butyl-4-chloro-2-hydroxybenzene-sulfonyl chloride and omega-aminovaleraldehyde dimethyl acetal. | 5-butyl-4-chloro-2-hydroxy-N-(5,5-dimethoxypentyl)-1,3-benzenesulfonamide; 3-butyl-2-chloro-8,9,10,10a-tetrahydro-7H-pyrido(1,2-b)(4,1,2)benz-oxathiazine 5,5-dioxide. |
| 5-butyl-4-chloro-2-hydroxybenzene-sulfonyl chloride and omega-aminocaproaldehyde dimethyl acetal. | 5-butyl-4-chloro-2-hydroxy-N-(6,6-dimethoxyhexyl)benzene-sulfonamide; 3-butyl-4-chloro-7,8,9,10,11,11a-hexahydroazepino (1,2-b)(4,1,2)benzoxathiazine 5,5-dioxide. |
| 2-hydroxy-p-toluenesulfonyl chloride and omega-amino-butyraldehyde dimethyl acetal. | 2-hydroxy-4-methyl-N-(4,4-dimethoxybutyl)benzenesulfona-mide; 8-methyl-1,2,3,10a-tetra-hydropyrrolo(1,2-b)(4,1,2)benz-oxathiazine 5,5-dioxide. |
| 2-hydroxy-p-toluenesulfonyl chloride and omega-amino-caproaldehyde dimethyl acetal. | 2-hydroxy-4-methyl-N-(6,6-di-methoxyhexyl(benzenesulfon-amide; 2-methyl-7,8,9,10,11,11a-hexahydroazepino(1,2-b)(4,1,2)-benzoxathiazine 5,5-dioxide. |
| 5-bromo-2-hydroxy-p-toluenesul-fonyl chloride and omega-aminobutyraldehyde diethyl acetal. | 5-bromo-2-hydroxy-N-(4,4-di-ethoxybutyl)-p-toluenesulfona-mide; 7-bromo-8-methyl-1,2,3,10a-tetrahydropyrrolo(1,2-b)(4,1,2)benzoxathiazine 5,5-dioxide. |
| 5-bromo-2-hydroxy-p-toluenesul-fonyl chloride and omega-aminovaleraldehyde diethyl acetal. | 5-bromo-2-hydroxy-N-(5,5-di-ethoxypentyl)-p-toluenesul-fonamide; 3-bromo-2-methyl-8,9,10,10a-tetra-7H-hydro-pyrido(1,2-b)(4,1,2)benzoxathi-azine 5,5-dioxide. |
| 5-bromo-2-hydroxy-o-toluenesul-fonyl chloride and omega-aminocaproaldehyde diethyl acetal. | 5-bromo-2-hydroxy-N-(6,6-di-ethoxyhexyl)-p-toluenesulfona-mide; 3-bromo-2-methyl-7,8,9,10,11,11a-hexahydroazepino (1,2-b)(4,1,2)benzoxathiazine 5,5-dioxide. |

The effective dosage of the present compounds can vary over a wide range from about 50 to about 500 milligrams per day or more, administered in the form of tablets, pills, capsules or of injectable solutions with the proper solid or liquid carrier. As the present compounds can be conventionally placed in suitable dosage forms by pharmacists only one example is given below of the various possible unit dosage forms.

*Example 4.—Tablet*

|  | Mg. |
|---|---|
| 7-chloro-1,2,3-10a-tetrahydro-8-methylpyrrolo [1,2-b] [4,1,2] benzoxathiazine 5,5-dioxide | 50 |
| Lactose | 26.2 |
| Starch | 20.6 |
| Magnesium stearate | 0.5 |

In making the above tablet, the active ingredient is mixed with the lactose and part of the starch and granulated with a sufficient quantity of paste made from the remainder of the starch. The granulated material is dried at 40–50° C. and screened through 90 mesh. Next the magnesium stearate is screened onto the granulation with which it is blended. Tablets are pressed from the blend with a suitable tabletting machine.

What is claimed is:
1. A compound of the formula:

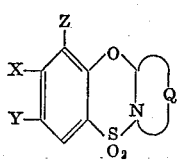

wherein X and Y are selected from the group of hydrogen (lower)alkyl having up to 5 carbon atoms in the alkyl chain, and halogen; Q is a polymethylene chain having from 3 to 5 carbon atoms therein; Z is selected from the group of hydrogen, 2-alkoxy-pyrrolidin-1-yl-sulfonyl, 2-alkoxy-piperidin-1-yl-sulfonyl and 2-alkoxyhexahydroazepin-1-yl-sulfonyl.

2. 7 - chloro - 1,2,3,10a-tetrahydro-8-methyl-9-(2-ethoxy - 1 - pyrrolidinylsulfony)pyrrolo(1,2-b)(4,1,2)benzoxathiazine 5,5-dioxide.

3. 7 - chloro - 1,2,3-10a - tetrahydro-6-methyl-9-(2-ethoxy - 1 - pyrrolidinylsulfonyl)pyrrolo(1,2-b)(4,1,2) benzoxathiazine 5,5-dioxide.

4. 7 - chloro - 1,2,3-10a-tetrahydro-8-methyl-pyrrolo (1,2-b)(4,1,2)benzoxathiazine 5,5-dioxide.

No references cited.

WALTER A. MODANCE, *Primary Examiner.*

J. M. FORD, *Assistant Examiner.*